United States Patent
Lee et al.

(10) Patent No.: US 8,014,944 B2
(45) Date of Patent: Sep. 6, 2011

(54) METHOD FOR AUTO-UPDATING APPLICATION PROGRAM

(75) Inventors: Chun-Yi Lee, Taipei County (TW); Huey-Ping Cheng, Kaohsiung (TW)

(73) Assignee: Mitac International Corp., Gueishan Shiang, Taoyuan (TW)

(*) Notice: Subject to any disclaimer, the term of this patent is extended or adjusted under 35 U.S.C. 154(b) by 992 days.

(21) Appl. No.: 11/457,466

(22) Filed: Jul. 14, 2006

(65) Prior Publication Data

US 2007/0016361 A1    Jan. 18, 2007

(30) Foreign Application Priority Data

Jul. 15, 2005   (TW) .............................. 94124048 A

(51) Int. Cl.
 *G01C 21/30* (2006.01)
(52) U.S. Cl. ............... 701/208; 700/200; 455/456.5; 340/995.1; 709/203; 709/204
(58) Field of Classification Search ............... 455/456.5; 701/200; 340/995.1; 704/E15.047; 709/203, 709/204, 21
See application file for complete search history.

(56) References Cited

U.S. PATENT DOCUMENTS

| | | | | |
|---|---|---|---|---|
| 5,802,492 | A * | 9/1998 | DeLorme et al. | 455/456.5 |
| 5,848,373 | A * | 12/1998 | DeLorme et al. | 701/200 |
| 5,948,043 | A * | 9/1999 | Mathis | 701/208 |
| 6,332,163 | B1 * | 12/2001 | Bowman-Amuah | 709/231 |
| 6,434,568 | B1 * | 8/2002 | Bowman-Amuah | 707/103 R |
| 6,453,233 | B1 | 9/2002 | Kato | |
| 6,546,334 | B1 | 4/2003 | Fukuchi | |
| 6,571,282 | B1 * | 5/2003 | Bowman-Amuah | 709/219 |
| 6,640,238 | B1 * | 10/2003 | Bowman-Amuah | 709/201 |
| 6,792,394 | B1 * | 9/2004 | Matsko et al. | 702/187 |
| 6,847,892 | B2 * | 1/2005 | Zhou et al. | 701/213 |
| 6,853,911 | B1 * | 2/2005 | Sakarya | 701/208 |
| 6,917,878 | B2 * | 7/2005 | Pechatnikov et al. | 701/210 |
| 6,960,997 | B2 * | 11/2005 | Gieseke et al. | 340/539.13 |
| 7,015,817 | B2 * | 3/2006 | Copley et al. | 340/573.4 |
| 7,089,110 | B2 * | 8/2006 | Pechatnikov et al. | 701/210 |
| 7,110,728 | B2 * | 9/2006 | Mizui et al. | 455/99 |
| 7,373,244 | B2 * | 5/2008 | Kreft | 701/207 |

(Continued)

FOREIGN PATENT DOCUMENTS

DE    198 42 430 A1    3/1999

(Continued)

OTHER PUBLICATIONS

Pat McLain, Mobile GIS technology update, 2004, Internet, p. 1-9.*

*Primary Examiner* — James Trammell
*Assistant Examiner* — McDieunel Marc
(74) *Attorney, Agent, or Firm* — Winston Hsu; Scott Margo

(57) ABSTRACT

A method for auto updating application program suitable for a global position system (GPS) navigator is provided. The method comprises the following steps. First, a map-update short message is sent to the GPS navigator at a client terminal from a wireless station. Then, a map-downloading program inside the GPS navigator is woken up when the GPS navigator receives the map-update short message. Then, connecting to a map server through the map-update short message when a user decides to update the map. Accordingly, a newest electronic map can be downloaded from the wireless station.

11 Claims, 3 Drawing Sheets

U.S. PATENT DOCUMENTS

| | | |
|---|---|---|
| 7,403,851 B2 * | 7/2008 | Kaufman et al. ............ 701/200 |
| 7,474,232 B2 * | 1/2009 | Chen et al. ................ 340/932.2 |
| 7,668,653 B2 * | 2/2010 | Habaguchi .................... 701/209 |
| 2002/0091793 A1 * | 7/2002 | Sagie ........................... 709/217 |
| 2002/0174360 A1 * | 11/2002 | Ikeda ........................... 713/200 |
| 2002/0186144 A1 * | 12/2002 | Meunier .................. 340/825.28 |
| 2003/0229441 A1 * | 12/2003 | Pechatnikov et al. ........ 701/201 |
| 2004/0215373 A1 * | 10/2004 | Won et al. .......................... 701/1 |
| 2005/0033511 A1 * | 2/2005 | Pechatnikov et al. ........ 701/210 |
| 2005/0075787 A1 * | 4/2005 | Chou ........................... 701/208 |
| 2005/0197767 A1 * | 9/2005 | Nortrup ........................ 701/209 |
| 2005/0219268 A1 * | 10/2005 | Kyle ............................. 345/660 |
| 2005/0229093 A1 * | 10/2005 | Campbell et al. ............. 715/500 |
| 2005/0251331 A1 * | 11/2005 | Kreft ............................. 701/207 |
| 2006/0025160 A1 * | 2/2006 | Kodali et al. .............. 455/456.5 |
| 2006/0080030 A1 * | 4/2006 | Okude et al. ................. 701/208 |
| 2006/0095202 A1 * | 5/2006 | Atarashi et al. .............. 701/208 |
| 2006/0136891 A1 * | 6/2006 | Oraee ........................... 717/168 |
| 2006/0182055 A1 * | 8/2006 | Coffee et al. ................. 370/328 |
| 2006/0253453 A1 * | 11/2006 | Chmaytelli et al. ............ 707/10 |
| 2007/0042790 A1 * | 2/2007 | Mohi et al. ................. 455/456.5 |
| 2007/0130333 A1 * | 6/2007 | Bhalla et al. ................. 709/224 |
| 2007/0252724 A1 * | 11/2007 | Donaghey et al. ............ 340/905 |
| 2008/0033639 A1 * | 2/2008 | Nakamura et al. ............ 701/208 |
| 2008/0133124 A1 * | 6/2008 | Sarkeshik ..................... 701/201 |
| 2008/0177709 A1 * | 7/2008 | Chiu et al. ......................... 707/3 |
| 2008/0186166 A1 * | 8/2008 | Zhou et al. ................ 340/539.13 |
| 2009/0298542 A1 * | 12/2009 | Lord ............................. 455/558 |
| 2009/0313359 A1 * | 12/2009 | Yeap et al. .................... 709/221 |
| 2010/0075643 A1 * | 3/2010 | Cooper et al. ............. 455/414.1 |

FOREIGN PATENT DOCUMENTS

DE            199 30 796 A1        1/2001

* cited by examiner

METHOD FOR AUTO-UPDATING APPLICATION PROGRAM

CROSS-REFERENCE TO RELATED APPLICATION

This application claims the priority benefit of Taiwan application serial no. 94124048, filed on Jul. 15, 2005. All disclosure of the Taiwan application is incorporated herein by reference.

BACKGROUND OF THE INVENTION

1. Field of the Invention

The present invention relates to a method for updating application program, and more particularly, to a method for auto-updating application program by using a Wireless Application Protocol (WAP) service.

2. Description of the Related Art

In recent years, highly developed technologies and human cultures have brought dramatic revolution on various activities in our daily life. The trend of future will be toward more convenient and more humane.

Global Position System (abbreviated as "GPS" hereinafter) is a navigation system that combines the satellite and the wireless technique, mainly applied on works related to navigation and positioning, precise measurement and accurate timing. GPS is able to continuously provide accurate positioning, speed, and time to the user for his/her operation without restriction by location, time and the weather. Accordingly, the application of GPS has been widely accepted in the current market. Along with the improvement of the satellite technology, various technologies and business opportunities related to GPS has been rapidly developed. The GPS navigator is a modern electronic apparatus developed to accommodate with the booming development of the wireless communication technology and the satellite navigation system. The GPS navigator can be applied on portable electronic apparatuses such as the notebook PC (a.k.a. laptop), the cell phone, and the Personal Digital Assistant (PDA) or even applied on the satellite navigation system in a vehicle.

Along with globalization and traffic conveniences, distances between separate regions are becoming shorter and that provide people with more opportunities for working or traveling between countries or cities. Thus, the GPS navigator can help a user to be familiar with the surroundings without being lost when the user is in a strange place.

However, if the user desires to go to an unfamiliar place by using the GPS navigator to avoid him/her from being lost, the user must in advance purchase the electronic map of the destination or download the electronic map from a specific website. If the user desires to update his/her current electronic map in the GPS navigator, the user needs to make sure whether there is a newer version or not and purchase the newer version or download it from the related website. If the GPS navigator is used in such way, the flexibility of use is reduced and it will be inconvenient for the user. In addition, if the electronic map is downloaded from the related website, the data range of the electronic map may exceed the local range desired by the user. For example, the user may only need an electronic map for one city, but the downloaded electronic map may cover a whole country. The excessive data from the electronic map is not only useless, but also wasteful of time to download and memory space.

SUMMARY OF THE INVENTION

Therefore, it is an object of the present invention to provide a method for auto-updating application program, which uses the Wireless Application Protocol (WAP) to provide a function of downloading the electronic map, such that the time and cost spent on updating the electronic map is effectively reduced.

In order to achieve the object mentioned above, the present invention provides a method for auto-updating application program. The method comprises the following steps. First, a wireless station sends a map-update short message to the GPS navigator at a client terminal. Then, a map-downloading program inside the GPS navigator is woken up when the GPS navigator receives the map-update short message. Then, connecting to a map server through the map-update short message when a user decides to update the map, and the GPS navigator is automatically connected to the map server. Finally, the newest electronic map can be downloaded.

In accordance with an embodiment of the present invention, the map-update short message may include address information of the wireless station and map version information.

In accordance with an embodiment of the present invention, the steps of receiving the map-update short message further comprise: decoding the map-update short message for obtaining a wake-up message; decoding the wake-up message for obtaining a Wireless Data Protocol (WDP) port number; and verifying the WDP port number for waking up the map-downloading program inside the GPS navigator.

In accordance with an embodiment of the present invention, the map server, for example, has a WAP web page for supporting the step of downloading the newest electronic map.

In accordance with an embodiment of the present invention, the GPS navigator at client terminal is connected to the map server through a General Packet Radio Service (GPRS) for downloading the newest electronic map. In addition, the method further comprises the step of providing a mode for the user to select a map range, wherein the map range may include a local map or a city map, which matches with a desired area for browsing.

In summary, the present invention provides a method for auto-updating application program, such that a user is no longer required to purchase or download updated electronic map of destination in advance when the user desires go to a place. Instead, a map-update short message is sent to the GPS navigator at the client terminal through a wireless station of the area where the client terminal is located and the GPS navigator is connected to a map server for downloading the electronic map where the user is located.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1:
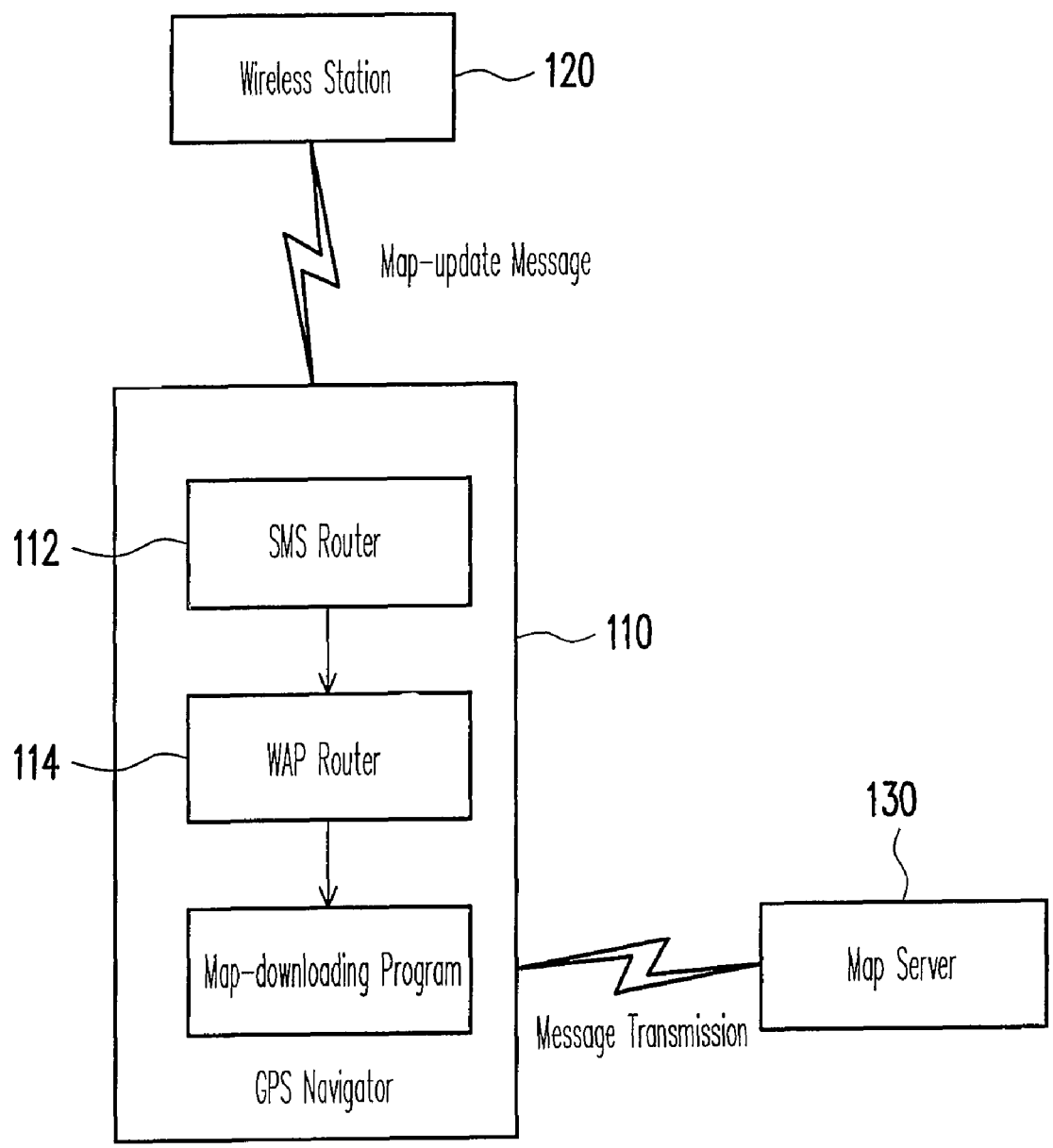
FIG. 1 schematically shows a method for auto-update application program executed by the GPS navigator according to a preferred embodiment of the present invention.

FIG. 1 schematically shows a method for auto-update application program executed by the GPS navigator according to a preferred embodiment of the present invention. Referring to FIG. 1, the method for auto-updating application program provided by the present invention is suitable for a GPS navigator 110 and a wireless station 120 connected to the GPS navigator 110. The wireless station 120 is a communication station built at any city or location by the communication vendor, such that the client terminal can easily receive the short message sent by the wireless station 120 everywhere. The GPS navigator 110 first receives a map-update short message from the wireless station 120 and an internal program is executed to decode and recognize the map-update short message, such that the GPS navigator 110 is connected to a map server 130 for downloading the newest electronic map. In this embodiment, the map-update short message may be address information of the wireless station 120 and map version information.

Figure 2:
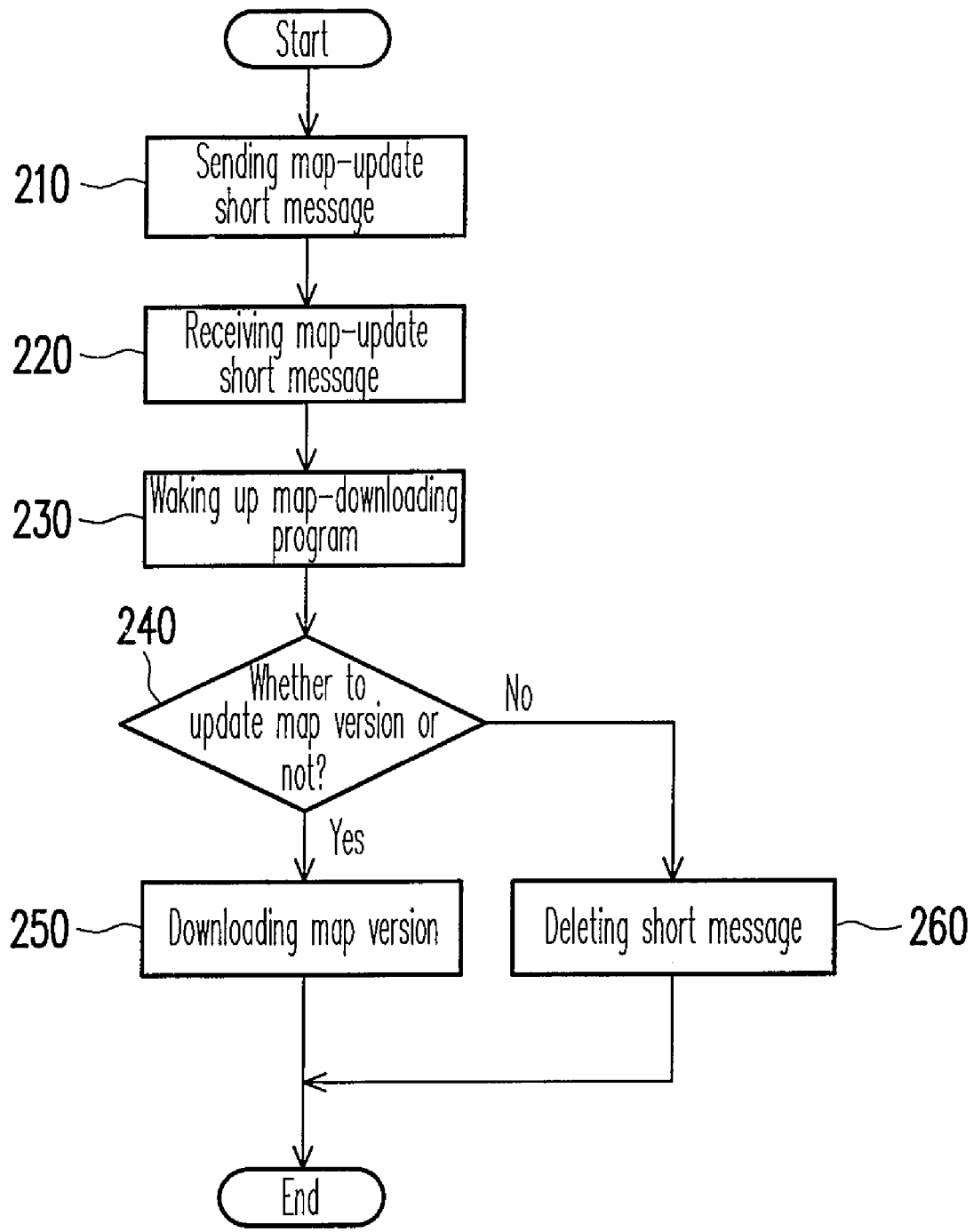
FIG. 2 schematically shows a flow chart illustrating a method for auto-updating application program according to the preferred embodiment of the present invention.

FIG. 2 schematically shows a flow chart illustrating a method for auto-updating application program according to the preferred embodiment of the present invention. Referring to FIG. 2, the method comprises the following steps: first, a map-update short message is sent to the GPS navigator 110 at a client terminal (step 210); the map-update short message sent from the wireless station 120 is received (step 220); a map-downloading program inside the GPS navigator 110 is woken up (step 230); it is to determine whether to update the map version (step 240); the GPS navigator 110 is connected to a map server 130 for downloading the newest electronic map (step 250); the short message is deleted (step 260). Referring to FIG. 1 and FIG. 2, the method of the present embodiment comprises the following steps. First, the wireless station 120 executes step 210, the GPS navigator 110 at the client terminal executes step 220 and steps 230 and 240 are sequentially executed. If the client terminal decides to update the map version, the GPS navigator 110 at the client terminal executes step 250. Otherwise, if the client terminal does not want to update the map version, either step 260 is executed or the short message is disregarded.

Additional functions such as the map range selection and the language and voice selection may be further provided by the GPS navigator 110 mentioned above. The map range selection function is a mode provided by the GPS navigator 110 after the map-downloading program inside the GPS navigator 110 is woken up (step 230) or after connecting to the map server through the map-update message (step 250), which allows the user at the client terminal to adjust the appropriate map range in a more flexible way, such that the range of the download electronic map matches with the desired area for browsing, such as a local map or a city map. Accordingly, the problems such as the range of the downloaded electronic map is too wide, the time for downloading the electronic map is too long, and the memory space used by the GPS navigator is too big, are all resolved. Moreover, the language and voice selection function is suitable for the users in different countries. In addition, the map server 130 has a WAP (Wireless Application Protocol) web page for supporting the user to download the newest electronic map. WAP is a protocol for wireless application jointly developed by several network and communication vendors. With WAP, the user can obtain the web-based interactive information and application and connect to the specific WAP website by means of wireless. Since WAP is for the wireless environment, the application can be personalized, real-time and active, such as e-mail, real-time news and on-line shopping services. Furthermore, the electronic map may be the electronic map for every city in the world, which may include the street name, the interesting spot, the longitude and latitude and/or the contour line. The map server 130 may further comprise a map database which includes information on local diets, custom, culture and traffic. The GPS navigator 110 at the client terminal is connected to the map server 130 through the GPRS (General Packet Radio Service) for downloading the newest electronic map.

Figure 3:
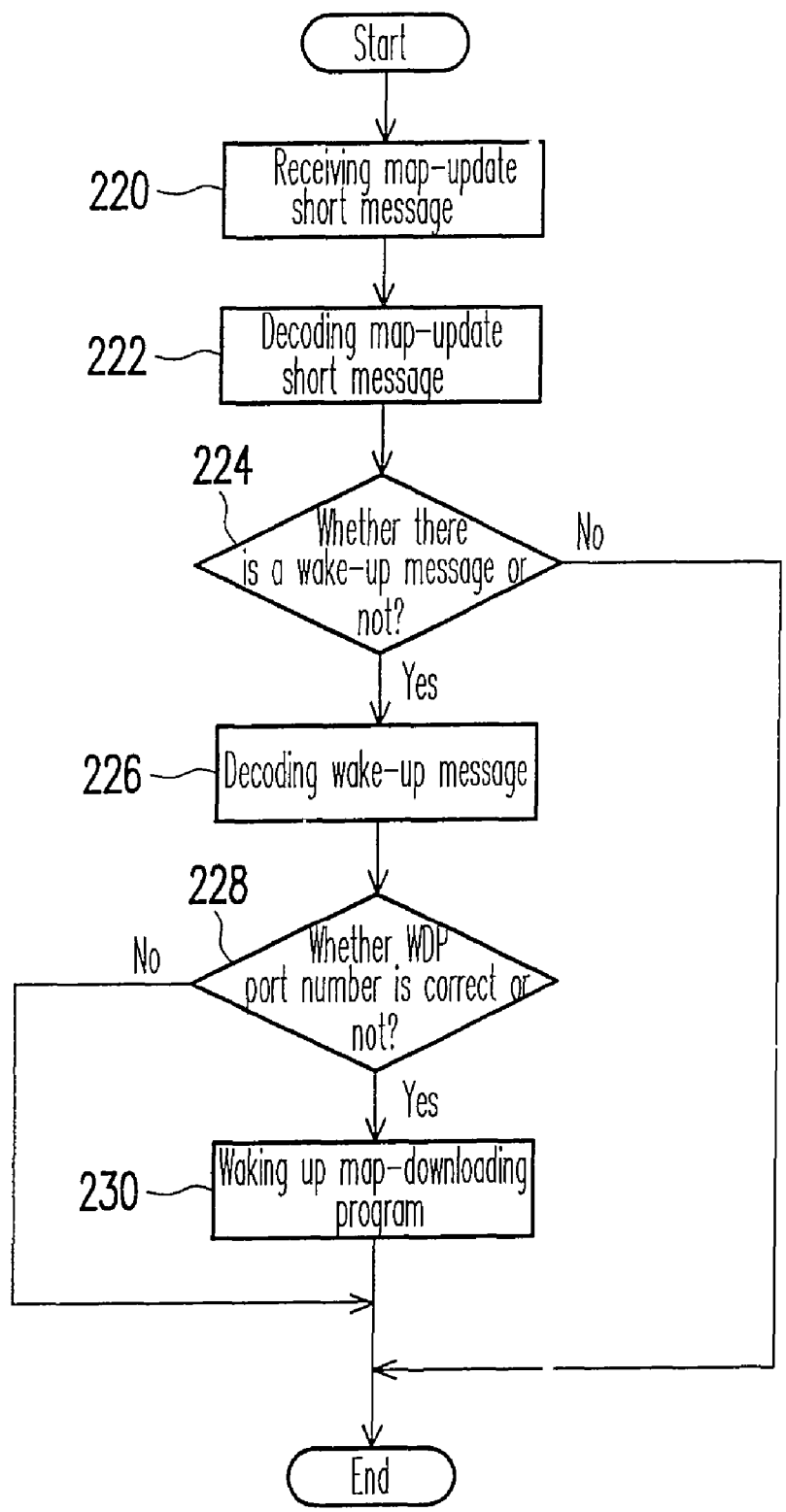
FIG. 3 schematically shows a flow chart illustrating a method for decoding and determining the map-update short message in the GPS navigator according to the preferred embodiment of the present invention.

FIG. 3 schematically shows a flow chart illustrating a method for decoding and determining the map-update short message in the GPS navigator according to the preferred embodiment of the present invention. Referring to FIG. 3, the method comprises the following steps: first, the map-update short message is decoded (step 222); it is to determine whether there is a wake-up message or not (step 224); the wake-up message is decoded (step 226); and it is to determine whether the WDP port number is correct or not (step 228). Referring to FIG. 1 and FIG. 3, when the GPS navigator 110 at the client terminal receives the map-update short message, steps 222 and 224 are sequentially performed by an SMS (Short Message Service) router 112 or a decoding apparatus. If a wake-up message is existed in the received map-update short message, the SMS router 112 will transmit the wake-up message to a WAP router 114 for executing step 226, so as to obtain a WDP port number. Then, in step 228, after the WDP port number has been confirmed, a map-downloading program inside the GPS navigator 110 is woken up.

The Short Message Service (SMS) mentioned above is a service provided by the global mobile communication system to the user for sending/receiving any message by using short messages, wherein the message may be a text message, a voice message or a text message with graphic data. However, the data amount for each transmission has a constant value (about 160 English words or 80 Chinese characters), and the SMS may be a short message broadcast service or the most popular point-to-point short message depending on the service object. Therefore, when the new version of the electronic map is published, with the present invention, a short message is sent to the client terminal through the wireless station and a map server provides the new version of the electronic map for client terminal to download, such that the electronic map of the GPS navigator at client terminal is maintained with the latest information. Furthermore, with the present invention, the GPS navigator at client terminal can download the electronic map of the area where the client terminal is located even when the location of the client terminal is changed.

In summary, the present invention provides a method for auto-updating application program, such that when a user at the client terminal wishes to go to a place using the assistance of GPS navigator, the user is no longer required to purchase or download the electronic map of the destination in advance. Instead, a map-update short message is sent to the GPS navigator at the client terminal through a wireless station of the area where the client terminal is located, and the GPS navigator is connected to a map server for downloading the electronic map where the user is located. Accordingly, the present invention can effectively reduce the time and cost spent on downloading the electronic map in the conventional technique and the use will be more convenient for the user.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for auto-updating application program suitable for a Global Position System (GPS) navigator, the method comprising:

sending a map-update short message to the GPS navigator at a client terminal from a wireless station, wherein the wireless station transmits the map-update short message to the GPS navigator without any prompt from the GPS navigator;

receiving the map-update short message and waking up a map-downloading program inside the GPS navigator;

connecting to a map server through the map-update short message when a user decides to update an electronic map of the GPS navigator; and downloading a newest electronic map from the map server to the GPS navigator, the newest electronic map corresponding to a current geographical location of the GPS navigator and indicating street names, longitude coordinates, and latitude coordinates for points depicted in the newest electronic map.

2. The method for auto-updating application program of claim 1, wherein the map-update short message comprises address information of the wireless station and map version information.

3. The method for auto-updating application program of claim 1, wherein the steps of receiving the map-update short message further comprise:

decoding the map-update short message for obtaining a wake-up message; and decoding the wake-up message for obtaining a Wireless Data Protocol (WDP) port number.

4. The method for auto-updating application program of claim 3, further comprising:

verifying the WDP port number to wake up the map-downloading program inside the GPS navigator.

5. The method for auto-updating application program of claim 3, wherein the map-update short message is decoded by a Short Message Service (SMS) router for obtaining the wake-up message.

6. The method for auto-updating application program of claim 3, wherein the wake-up message is decoded by a Wireless Application Protocol (WAP) router for obtaining the WDP port number.

7. The method for auto-updating application program of claim 1, wherein the map server has a WAP web page for supporting the step of downloading the newest electronic map.

8. The method for auto-updating application program of claim 1, wherein the GPS navigator at the client terminal is connected to the map server through a General Packet Radio Service (GPRS) for downloading the newest electronic map.

9. The method for auto-updating application program of claim 1, further comprising the step of providing a mode for the user to select a map range of the newest electronic map.

10. The method for auto-updating application program of claim 9, wherein the map range includes a local map or a city map, which matches with a desired area for browsing.

11. The method for auto-updating application program of claim 1, further comprising disregarding or deleting the map-update short message when the user decides not to update the electronic map of the GPS navigator.

* * * * *